United States Patent Office 3,072,140
Patented Jan. 8, 1963

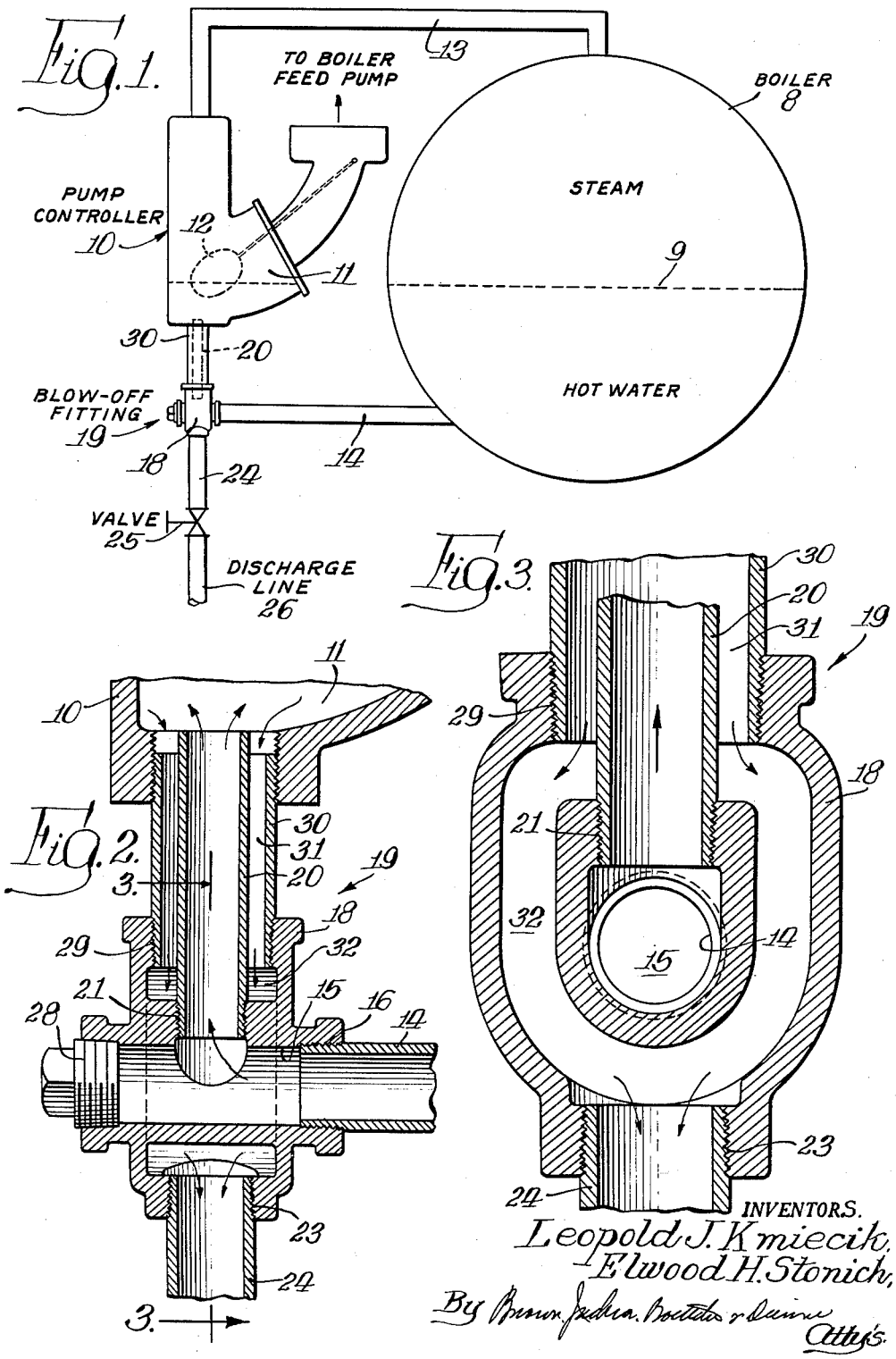

3,072,140
BLOW-OFF FITTING
Leopold J. Kmiecik, 6624 Navajo, Lincolnwood, Ill., and Elwood H. Stonich, 3853 N. Spaulding, Chicago, Ill.
Filed May 9, 1960, Ser. No. 27,698
1 Claim. (Cl. 137—428)

Our invention is directed to a blow-off fitting for use in boiler control systems in which water from the system may be used to advantage in flushing out the bowls or housing of float control devices in the system, which are subject to clogging due to the presence of scale and sediment present in liquid in the system. The fitting of our invention may, for example, be employed in association with a boiler so that water from the latter effects a scrubbing action in the bowl or chamber of the control device to remove accumulations of sediment or scale which, if not removed, may prevent the proper functioning of a float or other liquid level sensing element of the control device.

For the most efficient operation of a boiler, it is desirable to maintain its water level within certain upper and lower limits, and for this purpose a water feed arrangement is provided which may include a control means, such as a feed water pump controller which is suitably actuated to cause the energization of a supply or feed pump to deliver water to the boiler as required to maintain the aforementioned desired water level. The feed water pump controller may include a float or an analogous level sensing control device which is connected in the system so as to respond to the level of the water in the boiler. In one suitable arrangement, the feed water pump controller includes a bowl or chamber connected to and having a water level corresponding to that of the boiler with there being steam under pressure, generated by the boiler, above the water levels in the latter and the bowl or chamber of the control device. Accordingly, the position of the float in the feed water pump controller is indicative of the water level in the boiler, and movement of the float of the control is utilized to actuate a switch for regulating the supply or water feed pump in known manner. The boiler control system above mentioned is to be understood as being exemplary only of the utility of the fitting of our present invention for it may be associated with float control devices for a variety of other related purposes.

In the above described typical control system in which our invention has use, it is essential that the float in the float control device be freely movable to sense the level of the water in the same. However, impurities such as scale from the boiler and pipes, and sediment in the feed water, may accumulate in the bowl or float chamber of the control device and prevent the proper movement of the float, such as downward movement when the boiler water level drops below the desired or required minimum which movement is requisite to avoid damage to the boiler or control system.

It is an object of our present invention to provide a fitting for use in association with a boiler control system to utilize liquid in the system to effect scrubbing or cleansing of the bowl or chamber of a float control device for the system to assure the proper and accurate response of the float in the control device to the liquid level in the same.

A further object of our invention is to provide a fitting of the character noted having one passageway for admitting water from a source of water under pressure to the bowl or chamber of the control device for cleansing of the same, and a second passageway through which the washing water with the sediment entrained therein is discharged from the bowl or chamber of the control device.

The above and other objects of our invention will appear from the detailed description of a preferred embodiment of our invention.

Now in order to acquaint those skilled in the art with the manner of constructing and using a fitting of our invention, we shall describe in connection with the accompanying drawing a preferred embodiment of our invention.

In the drawings:

FIGURE 1 is a diagrammatic illustration of a boiler control system showing in side elevation a novel blow-off fitting of our invention;

FIGURE 2 is a vertical sectional view on an enlarged scale of the fitting of FIGURE 1 and a typical connection of the fitting in a system including a boiler and feed water pump controller; and FIGURE 3 is an enlarged vertical sectional view at right angles to the view of FIGURE 2, taken along the line 3—3 of FIGURE 2, and looking in a direction indicated by the arrows.

In the control system of FIGURE 1, a boiler 8 is suitably fired to heat water therein to provide steam under pressure in the upper portion of the boiler above the water level indicated at 9. The usual boiler water, steam output, and water feed pump devices and connections are conventional and well known in the art, and these and other known elements have therefore been omitted from the showing of FIGURE 1 to simplify the application.

Typically, a feed water pump controller, shown at 10, provides for control of delivery of water to the boiler 8. The pump controller 10 may, by way of example, be a Model 150 or 150–M of McDonnell & Miller, Inc., of Chicago, Illinois. The controller 10 includes a bowl or float chamber 11 in which a float 12 is provided to be responsive to the liquid level therein. The upper end of the housing of controller 10 has connection with the upper portion of boiler 8 by means of a pipe or conduit 13, and a water pipe or conduit 14 connects the lower portion of boiler 8 with a tapped inlet opening 16 at one end of bore 15 defining the beginning of an inlet passageway in the casing or body member 18 of the fitting illustrated generally at 19 of our invention. A conduit or pipe 20 has threaded connection at one end in a tapped opening 21 in body member 18, and the pipe or conduit 20 at its other end extends into and is suitably mounted at the lower end or the bowl or float chamber 11 of the control device 10. The several aforementioned components comprising bore 15 and pipe 20 may be considered as constituting an inlet passageway for admitting water from the boiler 8 to effect cleaning of control device 10.

The body member 18 of fitting 19 further includes a tapped discharge opening 23 into which one end of a discharge pipe or conduit 24 is threaded. The pipe 24 as best seen in FIGURE 1 extends to the inlet of a manually controlled shut-off valve 25, of any suitably known construction, and a pipe or conduit 26 extends from the outlet of valve 25 for leading to a sewer or otherwise to dispose of waste water used in cleaning of the bowl or float chamber 11 of the control device 10 as will presently appear. Bore 15 in the body member 18 at its end opposite the inlet opening 16 is closed by a conventional pipe plug 28. It will be seen that the bore 15, intermediate its end, is intersected by a tapped opening 21 for threadingly receiving one end of a pipe 20 which extends coaxially of and within a pipe 30 and into the bowl or float chamber 11 of control device 10. A tapped opening 29 threadingly receives pipe 30 at the top of body member 18, opening 29 being spaced above and concentric with tapped opening 21. The opposite end of pipe 30 is similarly received in the base of control device 10 to connect with its float chamber. The uppermost end of pipe 20 terminates substantially flush or even with the inside surface of the bottom wall of the float chamber 11, and it will be noted that the upper end of outer pipe 30, extending into the base of the control device, is somewhat below the level of the bottom wall of the float chamber.

The inner surface of the outer pipe 30 and the outer surface of inner pipe 20 define an annular channel 31 between the float chamber of the control device and body member 18 which connects with a channel 32 (FIGURE 3) extending substantially circumferentially around the portion of the body member 18 in which bore 15 is formed to connect the aforementioned annular channel 31 with the outlet or discharge opening 23 to which the discharge pipe 24 has threaded connection as aforedescribed. It will be thus seen that the annular passageway 31, channel 32 and outlet 23 constitute a water discharge passageway for flow of water outwardly or away from the housing of control device 10.

In the system above described and with the fitting 19 of our invention incorporated therein in the manner above noted, it will be observed that with manual valve 25 in its closed position, that the liquid level in the housing of the control device 10 will correspond with the liquid level 9 in the boiler. The float control device 10 as before noted includes the conventionally pivoted float member indicated at 12, which responds to the level of the liquid or water in control device 10. Movement of the float as before indicated may be associated with any other form of apparatus such, for example, as a water feed pump so that upon lowering of the float in response to lowering of the water level in the control device 10, a water feed pump is energized to charge the boiler with feed water to bring the water level therein to the desired predetermined minimum level. After the minimal level is attained, the movement of float 12 terminates the operation of the water feed pump. In systems such as described, the water used is frequently contaminated with sediment or other impurities and also in the operation of the system, the piping and other components may rust so that grit and scale accumulate at the bottom wall of the bowl 11 of the float control device 10. The accumulation of sediment at the bottom of the bowl may shortly build up to an extent that the float 12 will not properly effect actuation of the water feed pump for the boiler upon dropping of the boiler water level below the desired minimum level in that the sediment will hold or buoy up the float so that it does not assume a true position with respect to the liquid level in the control device. Before such condition can occur, it is desirable to effect cleaning of the bowl or float chamber 11 of the float control device 10. The fitting of our invention is admirably suited to this end and it will be observed that upon opening of the manually controlled valve 25, bowl 11 is vented to atmosphere and hot water in the boiler passes through the pipe 14 into bore 15 of the body of the fitting of our invention and vertically upwardly and through inner pipe 20 into bowl 11. The water thus delivered from the boiler to the float chamber is under pressure and is agitated so that it effects a scrubbing action of the inside bottom wall portion of the housing for the control device 10, and the washing medium is, as above mentioned, withdrawn from the bowl through annular passageway 31, channel 32 in fitting body member 18, discharge opening 23, pipe 24, valve 25, and to and through pipe 26. After the washing action has been carried on for a sufficient length of time to thoroughly cleanse the bowl of the control device the manually operated valve 25 is actuated by the operator to the closed position so that the steam and liquid levels between the boiler 8 and the control device 10 again stabilize and the boiler is returned to conventional operation.

While we have shown and described what we consider to be a preferred embodiment of our invention, it will be understood that various modifications and rearrangements may be made therein without departing from the spirit and scope of our invention.

We claim:

For use in a control system including a source of liquid under pressure with conduit means extending therefrom, a control device having a float chamber, and a discharge conduit having a valve therein for effecting opening and closing of the discharge conduit, the improvement which comprises: a blow-off fitting having a body member, said body member having a bore therein communicating at one end thereof with an inlet opening and at the other end thereof with an access opening, said inlet opening having connection with the conduit means, a closure member in said access opening adapted to be selectively removed for permitting access to the interior of the conduit means through said bore and said access opening, said body member having a channel therein extending circumferentially around said bore and communicating with an outlet opening, said outlet opening having connection with the discharge conduit, a first pipe connected with said bore and extending into the float chamber, a second pipe extending co-axially of and outwardly of said first pipe and having connection at one end with the float chamber and at the other end with said body member, and the inner surface of said second pipe and the outer surface of said first pipe defining an annular passage communicating at one end with the float chamber and at the other end with said channel.

References Cited in the file of this patent

UNITED STATES PATENTS

| | | |
|---|---|---|
| 336,307 | Foss | Feb. 16, 1886 |
| 706,886 | Bernardi | Aug. 12, 1902 |
| 759,131 | Rowinsky | May 3, 1904 |
| 1,108,603 | Merrill | Aug. 25, 1914 |
| 2,485,689 | Baumann | Oct. 25, 1949 |